United States Patent
Berkhin et al.

(10) Patent No.: US 7,596,587 B2
(45) Date of Patent: Sep. 29, 2009

(54) MULTI-TIERED STORAGE

(75) Inventors: Pavel Berkhin, Sunnyvale, CA (US);
Usama M. Fayyad, Sunnyvale, CA (US); Shanmugasundaram Ravikumar, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 320 days.

(21) Appl. No.: 11/489,885

(22) Filed: Jul. 19, 2006

(65) Prior Publication Data

US 2008/0021859 A1    Jan. 24, 2008

(51) Int. Cl.
*G06F 17/30* (2006.01)
(52) U.S. Cl. .............................. 707/204; 707/1; 711/117
(58) Field of Classification Search ........................ None
See application file for complete search history.

(56) References Cited

U.S. PATENT DOCUMENTS 7,113,935 B2 *   9/2006   Saxena .......................... 707/2

* cited by examiner

*Primary Examiner*—Jean B. Fleurantin
*Assistant Examiner*—Thu-Nguyet Le
(74) *Attorney, Agent, or Firm*—Weaver Austin Villeneuve & Sampson LLP

(57) ABSTRACT

Methods and apparatus are described for storing a plurality of objects in a plurality of storage options. An importance index is generated for each of the plurality of objects with reference to importance data associated with each object. At least a portion of the importance data represents relevance of the associated object relative to a population of users interacting with the plurality of objects. Each of the objects is stored in a selected one of the storage options with reference to the corresponding importance index and a hierarchy of the storage options. The hierarchy of storage options represents at least partial ordering of the storage options with reference to economic costs and efficiency of retrieval.

18 Claims, 2 Drawing Sheets

MULTI-TIERED STORAGE

BACKGROUND OF THE INVENTION

The present invention relates to techniques for optimizing the storage of a large number of objects over different types of storage and, in particular, to storing and migrating objects among the different storage options according to an importance measure associated with each.

Increasingly vast amounts of data are being stored by Internet services providers and enterprises. For example, providers of email services must provide huge amounts of storage as part of basic (often free) accounts. The economic burden associated with this obligation is further exacerbated by the ever-increasing volume of spam as well as by users using such storage to back up their data.

From the user's perspective, an important property of mail servers is that saved emails are perceived to be on-line, i.e., instantly available for reading. However, after a certain amount of time has passed, most emails are only rarely retrieved, and the majority are never retrieved. A current storage solution used by service providers to mitigate storage costs takes advantage of this fact. According to this approach, emails in the system are initially stored in more expensive memory, i.e., memory which provides users the "on-line" access they expect. After a certain period of time has passed, e.g., days or weeks, the emails are automatically stored in less expensive memory characterized, for example, by a longer access time. This migration is typically controlled by a hard-coded business rule.

While such an approach may mitigate the costs of mass storage for service providers, it is still a relatively crude approach which does not accurately reflect the usage patterns of particular individuals and objects. Therefore, there remains a need for techniques which more effectively balance the mitigation of storage costs with the expectation of users that their data will be readily accessible.

SUMMARY OF THE INVENTION

According to the present invention, techniques are provided to store objects or groups of objects across multiple storage options, and to control migration of the objects over the various options. According to a specific embodiment, methods and apparatus are provided for storing a plurality of objects in a plurality of storage options. An importance index is generated for each of the plurality of objects with reference to importance data associated with each object. At least a portion of the importance data represents relevance of the associated object relative to a population of users interacting with the plurality of objects. Each of the objects is stored in a selected one of the storage options with reference to the corresponding importance index and a hierarchy of the storage options. The hierarchy of storage options represents at least partial ordering of the storage options with reference to economic costs and efficiency of retrieval.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Exemplary embodiments of the invention will now be described with reference to the storage of emails across a number of storage options. More specifically, the examples below will assume a Web-based email service for which emails are stored in different storage options. As will be discussed, the available storage options may be distinguished with reference to various costs and benefits by which each option may be characterized. Notwithstanding reference to these specific examples, it should be noted that the present invention is not limited to such applications. That is, the techniques described herein may be applied to store virtually any type of object or groups of objects over a variety of storage options deployed in a wide variety of network topologies or even on a single, stand-alone system. And the present invention may be distinguished from conventional caching techniques in that the primary focus of caching is to provide fast access to objects of high relevance. By contrast, the present invention provides techniques for storing objects, e.g., emails, which may be highly irrelevant. Unlike conventional caching, the intent behind some embodiments of the invention is to store objects effectively "forever" which, in all likelihood, may never be accessed.

Figure 1:
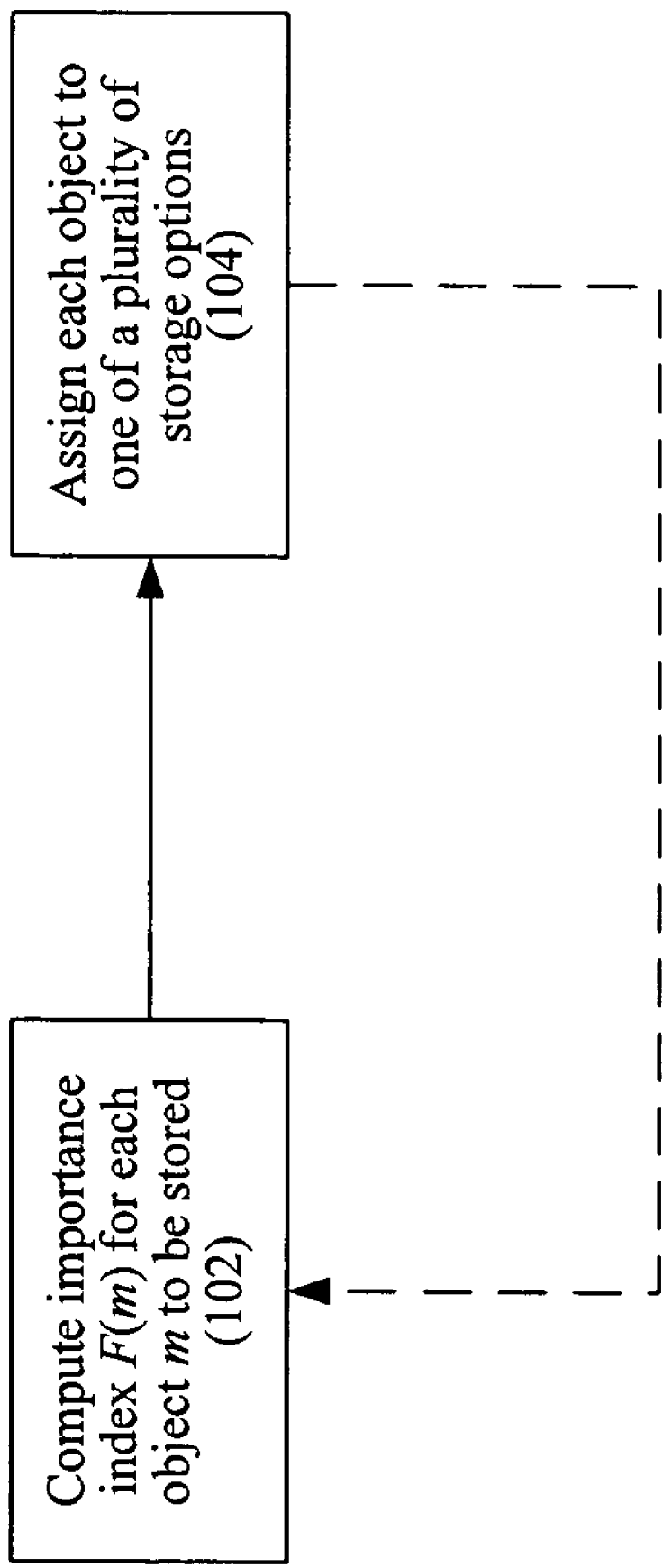
FIG. 1 is a simplified flow diagram illustrating operation of a specific embodiment of the invention.

Various embodiments of the invention may be represented by the flow diagram shown in FIG. 1. An importance index F(m) is computed for each object (or group of objects) m to be stored (102). According to a specific embodiment, each object m is an email. This importance index is used to assign each object to a particular one of a plurality of storage options (104) and, according to some embodiments, to control migration of the objects across the various storage options over time. This is represented by the dashed line which indicates periodic re-computation of the importance indices and movement of the objects from one storage option to another where warranted.

According to this exemplary implementation, the importance index F(m) is scaled to the interval between 0 and 1 and it is assumed that high values of F(m) (e.g., 0.95) correspond to important emails that should be stored on a "high quality" storage option, e.g., an option for which the speed of access is high. According to some embodiments, F(m) may be thought of, at least in part, as an estimated probability of the likelihood that the associated email will be retrieved. However, it should be noted that other measures of importance may be considered which either diminish or eliminate entirely the correlation between F(m) and this probability.

According to a particular subset of embodiments, the importance index F(m) is generated with reference to data representing an underlying user population U, e.g., a population of mail users. Each user u in U is represented by an associated vector of attributes. Some of the attributes may be static, while others may be dynamic. Such attributes might include, for example, user type, e.g., whether the user is a premium user or standard user. Attributes might also correspond to behavioral or profile data. Such data might represent, for example, user tenure, use of associated services, or membership in associated groups. User engagement data (e.g., as evidenced by clicks, page views, etc.) may also be used to represent each user.

For an implementation relating to storage of emails, relevant user attributes may also be derived from mail usage data such as, for example, the amount of storage consumed by the user, the kinds of attachments stored (e.g., does the user use the mail service as an archiving system), the size or pattern of use of the user's address list, how often emails are accessed, etc.

According to one implementation, a spam attribute which indicates whether a particular user is a potential spammer may be derived from behavioral data. Such a determination can be made in a variety of ways such as, for example, by human editorial analysis, from a known list of spammers, by analyzing volume and mailing patterns, or with reference to mail recipients, e.g., other known spammers.

As will be understood, depending on the objects to be stored and the user population U, a wide variety of attributes or parameters may be used to represent individual users u as a vector of attributes, $u=(u_1, u_1, \ldots, u_n)$.

Similarly, each object or group of objects to be stored may be represented by a vector or collection of attributes. In an application of the invention relating to the storage of emails, each email may be represented by such a vector, denoted herein as m. For the purposes of this example, we will assume that each email is treated as a separate object to be stored. However, it should be noted that aggregations of emails may be considered for storage without departing from the invention.

Let M be the set of all emails corresponding to all users in U. According to a specific embodiment, each email m in M is represented by a vector of attributes which includes representations of any of the sender, the receiver, the size, attachment properties, and access data. Users u and v may each be represented by a vector of attributes as described above.

The size of the email, denoted s, may be represented, for example, in bytes. According to some embodiments, s may include several variables such as, for example, title size, address list size, size of the recent text (vs. earlier text in a thread), and size of a previous mail thread (if applicable).

Attachment properties, denoted a, may include a wide variety of information relating to any attachment(s) associated with an email. For example, attachments may be characterized by their type (e.g., images) and size (e.g., in bytes).

Access data, denoted t, may include a wide variety of information such as, for example, information relating to how often and when the corresponding object has been accessed. For example, access data t may include the number of retrievals of a particular email. In addition, many emails belong to a sequence of emails, also referred to as a thread. For obvious reasons, retrieval characteristics of emails in a thread can be somewhat correlated. Therefore, access data t may include, for example, the number of retrievals of related emails in a thread. Access data t may also include recency information, i.e., how recently the corresponding object was retrieved or accessed.

In general, objects stored according to the invention may be represented or characterized by a wide variety of information some of which may be specific to the type of object to be stored. The parameters described above for emails are merely exemplary and are not intended to be an exhaustive or exclusive list. Additional parameters, e.g., whether an email was part of a group or mass mailing, are collectively denoted herein by z. Thus, according to the specific implementation being discussed, an email m may be represented by a vector of parameters, $m=(u, v, s, a, t, z)$. Using this information a predictive model may be constructed which provides a good estimate of the importance of each email. According to some embodiments, the importance may represent the likelihood that the email will be retrieved from storage, i.e., the email is important if it is very likely to be retrieved.

It should be noted that, according to the model described above, emails m establish a directed weighted graph on users in which an edge is an email sent from user u to user v, and the weight can be some function of the attributes of the email. However, while the above proposal uses the explicit edge relationships in this graph, embodiments are contemplated in which transitive and other derived relationships in this graph are employed.

According to specific embodiments, the construction of the importance index $F(m)$ from the mail feature vector m introduced above constitutes a regression predictive problem. As will be understood by those of skill in the art, a variety of tools are available for solving such problems, e.g., regression trees, neural networks, or support vector machines (SVMs). The predictive model may be developed from training or baseline data which may be initially generated manually by a human editorial process. That is, for example, a sample of emails could be identified by a human editor having relevant expertise as being important relative to some set of articulated goals or values. The predictive model is then developed from this sample and corresponding user data in a process referred to as training on labeled data. The predictive model is then applied to unlabeled data in a process referred to as scoring or forecasting.

As will be understood with reference to the foregoing, the present invention may be employed by a provider of email services to meet its obligation to permanently store its users' emails in a more cost effective way while still enabling retrieval in "nearly" real time. In addition, slower retrieval of backups would effectively fight spam without a threat of legal implications in case of false identification. Moreover, if an email is very unlikely to be retrieved (e.g., as indicated by its importance index), retrieval can be made sufficiently difficult to create a disincentive to retrieval. Such an effect could be useful, for example, to combat undesirable behavior (e.g., sharing music files) without having to specifically identify them or risk deleting something inadvertently.

As discussed above, the importance indices for stored objects may be computed periodically for the purpose of controlling migration of the objects over the various storage options. That is, according to embodiments of the invention, the important index $F(m)$ may be employed both to assign specific objects, e.g., emails, to the appropriate storage option $S(i)$, and to control migration of emails among the various storage options over time. For example, the importance index may be constructed such that its value decreases over time when the corresponding email is not retrieved. As a result, the email may be pushed down the storage hierarchy, e.g., from tier i to tier i+1 (or left on the bottom-most tier), when $F(m)$ reaches certain threshold(s) of unimportance. Conversely, an email may be pushed up or placed in the top tier if it is accessed.

Alternatively, a simpler heuristic may be employed that initializes a quantity $G(m)=F(m)$ when an email is assigned to storage option $S(i)$. Subsequently, assuming the email has not been retrieved, G(m) is updated at discrete times t such that G(m)=G(m)*exp(−$L_i$t). Emails with low values of G(m) or values which cross a threshold may then be considered candidates for eviction to a lower or less expensive storage option. Coefficient $L_i$ is specific to a corresponding storage option S(i) and allows incorporating simple recency policy effects. Such an approach substitutes the computation of G(m) in place of a relatively expensive re-computation of F(m), thus allowing F(m) to be updated less frequently. As will be understood, other heuristics that would allow deviation from using only F(m) are contemplated.

The foregoing discussion has not yet considered storage model parameters. According to some embodiments of the invention, such parameters support decision making regarding optimizing of storage investments. According to a specific embodiment of the invention, a storage model is employed to characterize various different types of storage options. It should be noted that virtually any type of storage option available in the relevant computing context may be included in and characterized according to such a model including, for example, disks, network attached storage, near line storage, or tape.

In addition, various levels of service within a particular memory type may be separately characterized as distinct storage options. For example, providers of storage services on the Internet often provide different levels of data services at a variety of price points, with the more expensive services typically providing the fastest and/or most flexible access to stored data. According to such business models, different levels of access may be provided to data stored in the same media. Thus, embodiments of the invention are contemplated in which such models are taken into account when characterizing different storage options.

According to a specific embodiment, storage options are modeled with reference to a variety of parameters representing various costs and benefits associated with each. Such parameters may include, for example, hardware costs (e.g., the actual cost of the storage device(s)), energy costs (i.e., the cost of power consumption by the storage device(s); typically comparable with hardware costs), rental costs (e.g., the cost of renting storage space from another provider), maintenance costs, and access time (i.e., the speed with which data can be retrieved; cheaper hardware usually means longer access times). It will be understood that this list of parameters is not exhaustive and that a variety of others will occur to those of skill in the art. In addition, the manner in which any such parameters are specified and combined to characterize storage options may vary considerably without departing from the invention.

According to some embodiments, the costs and benefits associated with compression algorithms may also be included in the storage model to fine tune storage costs. For example, one cost associated with a compression algorithm might be the amount of computation time involved in decompressing the data. On the other hand, a benefit might be the compression gain associated with the algorithm, i.e., the reduction of memory space required to store the compressed object(s). In addition, the algorithmic tradeoffs between such costs and benefits to minimize expected delays may be considered. For example, a relatively slow and diligent compression algorithm might be suitable for use on a lower-tier storage device given that the associated cost of retrieval is negligent relative to other access costs and/or the expected frequency of retrieval is low. And compression algorithms are generally more effective in terms of space saving when operating on large chunks of data, but since decompressing such large chunks of data takes more time, such compression may not be suitable for a high-availability storage tier. The costs of decompression are, however, cheap relative to access costs for low-tier storage that can benefit from better compression ratios.

Generally speaking, embodiments of the invention have some number k of storage options. These storage options may have a total ordering in which S(1), . . . , S(k) denotes the ordering, i.e., all of the available storage options are arranged from highest to lowest in accordance with some range of quality or desirability which may, itself, be determined with reference to a variety of metrics. Alternatively, the available options represented by S(1) through S(k) need not be completely ordered in this way. That is, subsets of storage options may be partially ordered, e.g., options could be arranged in a space with more complex relationships than a total ordering. Note that this ordering can be obtained by evaluating and prioritizing the above parameters.

Storage parameters characterizing a particular storage option S(i) may be combined with one or more object parameters (e.g., size) to derive a retrieval cost RC(i, m) representing the cost of retrieving a particular object from that storage option. According to some embodiments, such a retrieval cost may include a user satisfaction component. Retrieval cost may be a function of both the type of storage as well as the object. Storage parameters may also be used to derive a storage cost for an object SC(i, m)

Using these costs and assuming that the importance index associated with an email fairly represents the probability of retrieval of the corresponding email, a total cost for storing a given email in a particular storage option may be represented by the product of the retrieval cost and the expected rate of retrieval, plus the storage cost or:

$$F(m)*RC(i,m)+SC(i,m)$$

In what follows, we drop dependence of cost terms on object m and consider average costs per unit of memory (normalized for a potential compression effect) resulting in:

$$F(m)*RC(i)+SC(i)$$

According to a specific embodiment of the invention, this total cost may be used to derive a threshold which may be used to determine when to evict an email from one storage option to a lower quality storage option. Assuming a two-tiered storage system for the sake of simplicity, a threshold importance index value F(m)=f that may be used to determine when to evict an email from tier 1 to tier 2 may be given by:

$$f = \frac{SC(1) - SC(2)}{RC(2) - RC(1)}$$

This relation is derived by defining the threshold to be the point where the costs of storing an email in the two storage options is equal, e.g., f*RC(1)+SC(1)=f*RC(2)+SC(2) and solving for f.

It should be noted that the above reasoning generalizes to any two consecutive memory tiers. It should also be noted that, although for the purpose of illustrating this concept, the dependency on m has been disregarded and an average value has been used, that this dependency can be included in the calculation.

And from the formulation for f, a proportion of the storage volumes of the two tiers can easily be determined as a ratio of compressed email sizes for m with F(m)>f and for m with F(m)<f.

According to specific embodiments of the invention, further enhancements and/or efficiencies may be realized through the recognition of common characteristics among users and/or the objects to be stored. For example, user segments may be defined which share some common content preferences. Common content results in lower entropy which, in turn, lead to better compression of the data to be stored.

In another example, and as mentioned above, embodiments of the present invention may operate on individual objects as well as groups of objects. Such embodiments can take advantage of common characteristics of related objects to achieve better results. In particular, common characteristics of related emails, e.g., emails in a thread or broadcast emails, may be reflected both in the manner in which emails are characterized and the manner in which storage costs are evaluated and used to make decisions as to where an email should be stored. For example, the present invention may be used to control migration of entire email threads between or among available storage options. And because such threads typically share a lot of text, better compression may be achieved.

In addition, benefits may be achieved by taking a more coarsely grained approach to object storage. For example, rather than storing each individual email, a mailbox may instead be divided into coarser "chunks." As will be understood, the level of granularity may be a traded off against performance, user experience, and software overhead.

Figure 2:
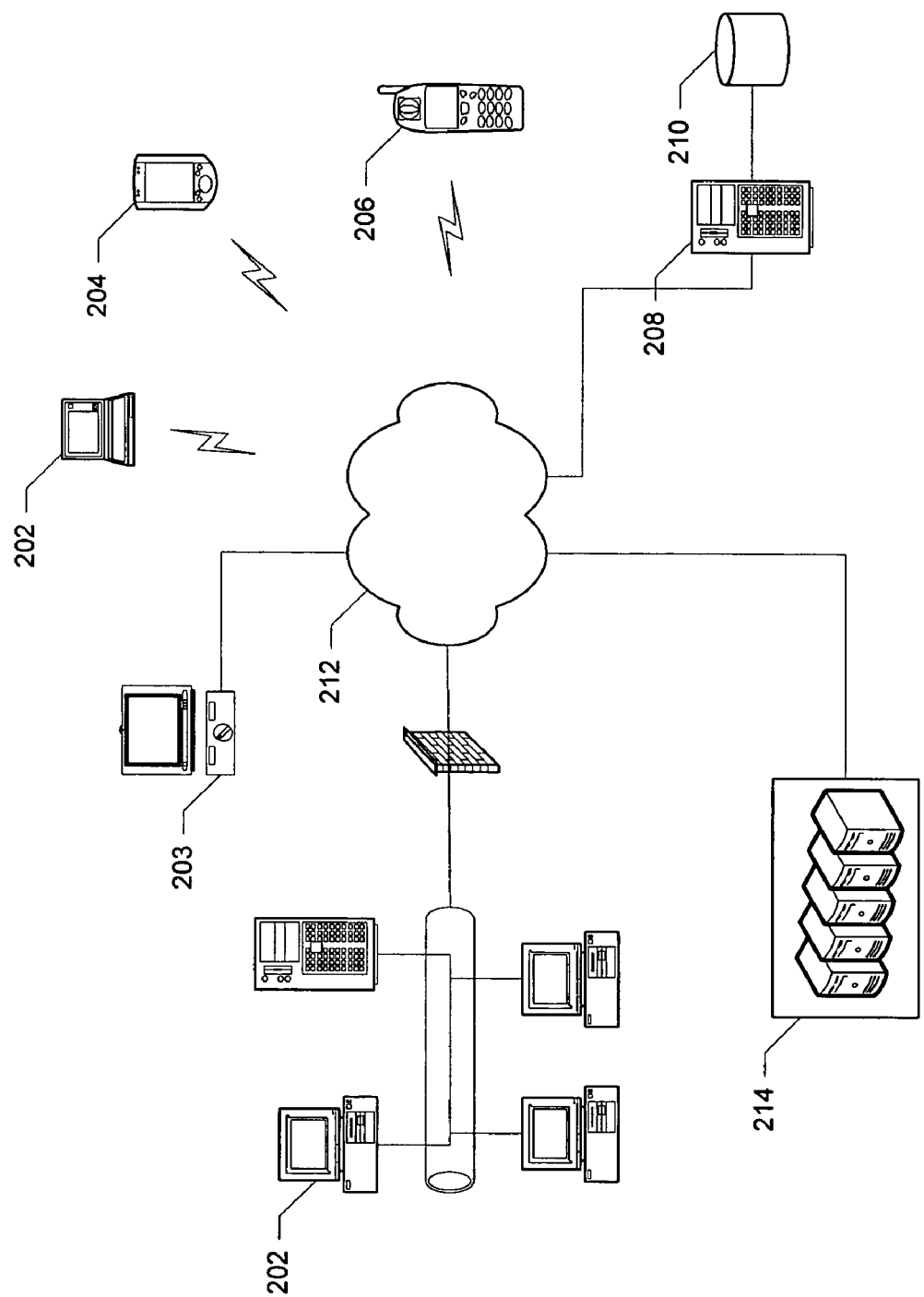
FIG. 2 is a simplified diagram of an exemplary computing environment in which embodiments of the present invention may be practiced.

Embodiments of the present invention may be practiced in any of a wide variety of computing contexts. For example, as illustrated in FIG. 2, the relevant population of users may interact with the objects to be stored (e.g., emails) in a diverse network environment via any type of computer (e.g., desktop, laptop, tablet, etc.) 202, media computing platforms 203 (e.g., cable and satellite set top boxes and digital video recorders), handheld computing devices (e.g., PDAs) 204, cell phones 206, or any other type of computing or communication platform.

And according to various embodiments, user data processed in accordance with the invention may be collected using a wide variety of techniques. For example, collection of data representing a user's interaction with specific Web pages may be accomplished using any of a variety of well known mechanisms for recording a user's online behavior. However, it should be understood that such methods of data collection are merely exemplary and that user data may be collected in many other ways. For example, user data may be collected when a user registers with, for example, a particular web site or service.

Once collected, the user data along with data associated with the various object and storage models described herein are processed and stored in some centralized manner. This is represented in FIG. 2 by server 208 and data store 210 which, as will be understood, may correspond to multiple distributed devices and data stores. The invention may also be practiced in a wide variety of network environments (represented by network 212) including, for example, TCP/IP-based networks, telecommunications networks, wireless networks, etc.

As mentioned above, the storage options (represented by storage 214) which may be modeled and employed in accordance with specific embodiments of the invention may vary considerably, including a wide variety of platform and device types, as well as different levels of service and/or performance.

In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. For example, as discussed above, an importance index may be calculated for virtually any type of object to be stored over a plurality of storage options. In addition, an importance index and related data generated in accordance with the invention may be used for other purposes beyond assigning an object to a storage option. For example, emerging mail patterns (e.g., as evidenced by email vectors) can be used in mail fraud detection along with importance index F(m) serving as an additional feature in machine learning of fraud.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for storing a plurality of objects in a plurality of storage options, the plurality of objects being characterized by an associated obligation of permanent storage, the method comprising:

generating an importance index for each of the plurality of objects with reference to importance data associated with each object, at least a portion of the importance data representing relevance of the associated object relative to a population of users interacting with the plurality of objects, the importance index representing a likelihood that the corresponding object will be retrieved;

storing each of the objects in a selected one of the storage options with reference to the corresponding importance index and a hierarchical model of the storage options, the hierarchical model of storage options at least partially ordering the storage options with reference to economic costs and efficiency of retrieval;

controlling migration of selected ones of the plurality of objects across the storage options with reference to recomputed values of the corresponding importance indices and the hierarchical model while meeting the obligation of permanent storage for the plurality of objects, wherein migrating each object comprises copying the object from a first storage option to a second storage option among the plurality of storage options and removing the object from the first storage option; and employing a machine learning technique to forecast the importance index for at least some of the plurality of objects with reference to a predictive model, the machine learning technique having been trained using training data corresponding to first ones of the objects identified as having relevance in the user population using a human-controlled editorial process.

2. The method of claim 1 wherein controlling migration of selected ones of the objects further comprises re-computing the importance index associated with the selected objects.

3. The method of claim 2 wherein re-computing the importance index comprises applying a time-dependent function to an initial value of the importance index.

4. The method of claim 3 wherein the time-dependent function includes a coefficient corresponding to a current one of the storage options in which the object corresponding to the importance index is stored.

5. The method of claim 1 wherein the machine learning technique comprises one of a regression tree, a neural network, and a support vector machine.

6. The method of claim 1 wherein the plurality of objects comprises a plurality of electronic mail items (emails).

7. The method of claim 6 wherein the importance data include a set of mail attributes characterizing the associated email, the set of mail attributes including at least one of sender data representing a sender of the associated email, receiver data representing at least one receiver of the associated email, size data representing a size of the associated email, attachment data representing at least one attachment for the associated email, access data representing access events for the associated email, and relational data representing relationships between the associated email and at least one other one of the emails.

8. The method of claim 7 wherein the sender and receiver data each include a set of user attributes characterizing the corresponding ones of the users, each set of user attributes including at least one of user type data representing a customer category with which the corresponding user is associated, user profile data representing demographic information for the corresponding user, and behavioral data representing online behavior of the corresponding user.

9. The method of claim 8 wherein the behavioral data represent any of tenure of the corresponding user relative to a specific service, use of associated services by the corresponding user, membership of the corresponding user in associated groups, and user engagement.

10. The method of claim 6 wherein at least some of the objects correspond to multiple related ones of the emails.

11. The method of claim 6 wherein the emails are represented by a directed weighted graph on the users.

12. The method of claim 11 wherein each edge in the graph corresponds to an email sent from a first user to a second user, and a weight of each edge is a function of a plurality of attributes characterizing the corresponding email.

13. The method of claim 1 wherein each of the storage options is characterized by at least one of a retrieval cost, a storage cost, a hardware cost, an energy cost, a rental cost, a backup cost, a maintenance cost, and a data compression cost.

14. The method of claim 13 wherein the data compression cost relates to decompression computation for a compression algorithm associated with the corresponding storage option, the corresponding storage option further being characterized by a compression gain associated with the compression algorithm.

15. The method of claim 1 wherein the storage options are distinguished from each other by at least one of hardware type, and level of service.

16. The method of claim 1 wherein storage volumes of selected ones of the storage options relates to a ratio of compressed object sizes for each of the selected storage options.

17. The method of claim 1 wherein higher and lower ones of the storage options are related in the hierarchical model and have an associated threshold such that first ones of the importance indices above the threshold result in the corresponding objects being stored in the higher storage option, and second ones of the importance indices below the threshold result in the corresponding objects being stored in the lower storage option, the threshold being derived with reference to retrieval and storage costs associated with both of the higher and lower storage options.

18. A system for storing a plurality of objects, the plurality of objects being characterized by an associated obligation of permanent storage, the system comprising:

a plurality of storage options configured in accordance with a hierarchical model, the hierarchical model of storage options representing at least a partial ordering of the storage options with reference to economic costs and efficiency of retrieval;

at least one computing device configured to:

generate an importance index for each of the plurality of objects with reference to importance data associated with each object, at least a portion of the importance data representing relevance of the associated object relative to a population of users interacting with the plurality of objects, the importance index representing a likelihood that the corresponding object will be retrieved;

assign each of the objects to a selected one of the storage options with reference to the corresponding importance index and the hierarchy of the storage options; and control migration of selected ones of the plurality of objects across the storage options with reference to recomputed values of the corresponding importance indices and the hierarchical model while meeting the obligation of permanent storage for the plurality of objects, wherein migrating of each object comprises copying the object from a first storage option to a second storage option among the plurality of storage options and removing the object from the first storage option; and employing a machine learning technique to forecast the importance index for at least some of the plurality of objects with reference to a predictive model, the machine learning technique having been trained using training data corresponding to first ones of the objects identified as having relevance in the user population using a human-controlled editorial process.

* * * * *

UNITED STATES PATENT AND TRADEMARK OFFICE
CERTIFICATE OF CORRECTION

PATENT NO. : 7,596,587 B2  Page 1 of 1
APPLICATION NO. : 11/489885
DATED : September 29, 2009
INVENTOR(S) : Berkhin et al.

It is certified that error appears in the above-identified patent and that said Letters Patent is hereby corrected as shown below:

In line 6 of claim 18 (column 10, line 30) change "employing" to --employ--.

Signed and Sealed this

Eighth Day of December, 2009

David J. Kappos
*Director of the United States Patent and Trademark Office*